(12) United States Patent
Recchia et al.

(10) Patent No.: US 9,402,050 B1
(45) Date of Patent: Jul. 26, 2016

(54) MEDIA CONTENT CREATION APPLICATION

(71) Applicant: SnipMe, Inc., Centreville, VA (US)

(72) Inventors: Philip Anthony Recchia, Trumbull, CT (US); Robert E. Mitchell, Centreville, VA (US)

(73) Assignee: SnipMe, Inc., Centreville, VA (US)

( * ) Notice: Subject to any disclaimer, the term of this patent is extended or adjusted under 35 U.S.C. 154(b) by 0 days.

(21) Appl. No.: 14/706,934

(22) Filed: May 7, 2015

(51) Int. Cl.
| | |
|---|---|
| *H04N 9/80* | (2006.01) |
| *H04N 5/77* | (2006.01) |
| *G06F 3/0484* | (2013.01) |
| *G06F 3/0482* | (2013.01) |
| *H04L 29/08* | (2006.01) |
| *H04N 5/85* | (2006.01) |
| *G11B 27/034* | (2006.01) |
| *G11B 31/00* | (2006.01) |
| *H04N 21/475* | (2011.01) |
| *H04N 21/81* | (2011.01) |

(Continued)

(52) U.S. Cl.
CPC .............. *H04N 5/772* (2013.01); *G06F 3/0482* (2013.01); *G06F 3/04842* (2013.01); *G11B 27/034* (2013.01); *G11B 31/006* (2013.01); *H04L 67/02* (2013.01); *H04N 5/85* (2013.01); *H04N 21/23424* (2013.01); *H04N 21/23617* (2013.01); *H04N 21/4622* (2013.01); *H04N 21/4756* (2013.01); *H04N 21/812* (2013.01)

(58) Field of Classification Search
CPC .......... H04N 21/4756; H04N 21/4622; H04N 21/812; H04N 21/23424; H04N 21/23617
USPC .......................................... 386/224, 262, 248
See application file for complete search history.

(56) References Cited

U.S. PATENT DOCUMENTS

| 5,778,181 A | 7/1998 | Hidary et al. |
| 6,715,126 B1 | 3/2004 | Chang et al. |

(Continued)

OTHER PUBLICATIONS

Office Action for U.S. Appl. No. 14/706,933 mailed Aug. 25, 2015.

(Continued)

*Primary Examiner* — Helen Shibru
(74) *Attorney, Agent, or Firm* — Duane S. Kobayashi

(57) ABSTRACT

In some embodiments an apparatus includes a processor included within a compute device, operatively coupled to a memory, and is configured to execute an application module and a recording module. The application module is configured to receive, at a compute device, an indication of a user selection of a video request from a list of video requests. The video request is associated with a list of characteristics and is associated with a video request identifier. The application module is configured to, based on the video request identifier, define a video recording environment in accordance with the list of characteristics. The recording module is configured to record, during a time and using a camera integrated with the compute device, a video such in accordance with the list of characteristics. The application module is configured to associate the video with a relationship indicator indicative of the relationship between the video and the video request. The application module is configured to send, to a server device from the compute device, a copy of the video including the relationship indicator such that the server (1) stores a copy of the video and (2) associates, based on the relationship indicator, the video with other videos that each have a relationship with the video request.

21 Claims, 10 Drawing Sheets

(51) Int. Cl.
*H04N 21/462* (2011.01)
*H04N 21/234* (2011.01)
*H04N 21/236* (2011.01)

(56) References Cited

U.S. PATENT DOCUMENTS

| | | | |
|---|---|---|---|
| 6,724,403 B1 | 4/2004 | Santoro et al. | |
| 6,903,779 B2 | 6/2005 | Dyer | |
| 7,027,054 B1 | 4/2006 | Cheiky et al. | |
| 7,028,264 B2 | 4/2006 | Santoro et al. | |
| 7,360,152 B2 | 4/2008 | Capps et al. | |
| 7,466,334 B1 * | 12/2008 | Baba | G11B 27/034 348/14.06 |
| 7,543,235 B2 | 6/2009 | Novak et al. | |
| 7,941,092 B2 | 5/2011 | Rao | |
| 7,941,819 B2 | 5/2011 | Stark et al. | |
| 8,234,218 B2 | 7/2012 | Robinson et al. | |
| 8,310,443 B1 * | 11/2012 | Pan | G06Q 30/02 345/156 |
| 8,341,037 B2 | 12/2012 | Bachman et al. | |
| 8,359,303 B2 | 1/2013 | Du et al. | |
| 8,451,379 B2 | 5/2013 | Goldey et al. | |
| 8,468,562 B2 | 6/2013 | Miller | |
| 8,539,359 B2 | 9/2013 | Rapaport et al. | |
| 8,645,599 B2 | 2/2014 | Jackson et al. | |
| 8,677,284 B2 | 3/2014 | Aguilar | |
| 8,682,809 B2 | 3/2014 | Avedissian et al. | |
| 8,700,714 B1 | 4/2014 | Pan et al. | |
| 8,732,579 B2 | 5/2014 | Rossmann et al. | |
| 8,732,605 B1 | 5/2014 | Falaki | |
| 8,756,333 B2 | 6/2014 | Jannink et al. | |
| 8,824,861 B2 | 9/2014 | Gentile et al. | |
| 8,935,611 B2 | 1/2015 | Oberbrunner et al. | |
| 2002/0042920 A1 | 4/2002 | Thomas et al. | |
| 2003/0001880 A1 | 1/2003 | Holtz et al. | |
| 2004/0154040 A1 * | 8/2004 | Ellis | H04N 5/44543 725/58 |
| 2006/0020962 A1 | 1/2006 | Stark et al. | |
| 2006/0184977 A1 | 8/2006 | Mueller et al. | |
| 2007/0094333 A1 | 4/2007 | C. Schilling et al. | |
| 2008/0270467 A1 | 10/2008 | Clarke | |
| 2008/0320522 A1 | 12/2008 | Jones | |
| 2009/0037802 A1 | 2/2009 | Klier et al. | |
| 2009/0144237 A1 | 6/2009 | Branam et al. | |
| 2009/0150369 A1 | 6/2009 | Du et al. | |
| 2009/0216577 A1 | 8/2009 | Killebrew | |
| 2010/0172632 A1 | 7/2010 | Sakata | |
| 2010/0198697 A1 * | 8/2010 | Brown | G06Q 30/02 705/14.73 |
| 2010/0318520 A1 | 12/2010 | Loeb et al. | |
| 2010/0332497 A1 | 12/2010 | Valliani et al. | |
| 2011/0035466 A1 | 2/2011 | Panigrahi | |
| 2011/0083074 A1 | 4/2011 | Jellison, Jr. et al. | |
| 2011/0154404 A1 | 6/2011 | Piepenbrink et al. | |
| 2011/0161485 A1 | 6/2011 | George et al. | |
| 2011/0218948 A1 | 9/2011 | De Souza et al. | |
| 2012/0158527 A1 | 6/2012 | Cannelongo et al. | |
| 2012/0192225 A1 | 7/2012 | Harwell et al. | |
| 2012/0278725 A1 * | 11/2012 | Gordon | H04N 21/2665 715/738 |
| 2013/0024895 A1 | 1/2013 | Yong et al. | |
| 2013/0073388 A1 * | 3/2013 | Heath | G06Q 50/01 705/14.53 |
| 2013/0073400 A1 * | 3/2013 | Heath | G06Q 30/02 705/14.73 |
| 2013/0110929 A1 | 5/2013 | Gundotra et al. | |
| 2013/0173690 A1 | 7/2013 | Gregg et al. | |
| 2013/0179925 A1 | 7/2013 | Woods et al. | |
| 2013/0201305 A1 | 8/2013 | Sibecas et al. | |
| 2013/0262585 A1 | 10/2013 | Niemeyer et al. | |
| 2013/0290996 A1 | 10/2013 | Davis | |
| 2013/0294751 A1 | 11/2013 | Maeda | |
| 2014/0013230 A1 | 1/2014 | Malone | |
| 2014/0019882 A1 | 1/2014 | Chew et al. | |
| 2014/0036022 A1 | 2/2014 | Croen et al. | |
| 2014/0067828 A1 | 3/2014 | Archibong et al. | |
| 2014/0068437 A1 * | 3/2014 | Dedapper | G06Q 50/01 715/719 |
| 2014/0096167 A1 | 4/2014 | Lang et al. | |
| 2014/0101548 A1 | 4/2014 | Alsina et al. | |
| 2014/0109144 A1 | 4/2014 | Asnis et al. | |
| 2014/0130068 A1 | 5/2014 | Patterson et al. | |
| 2014/0133829 A1 | 5/2014 | Howett | |
| 2014/0244859 A1 | 8/2014 | Jannink et al. | |
| 2014/0253727 A1 * | 9/2014 | Sadrieh | H04N 21/2743 348/143 |
| 2014/0280090 A1 | 9/2014 | Grappo | |
| 2014/0280657 A1 | 9/2014 | Miller et al. | |
| 2014/0325359 A1 | 10/2014 | Vehovsky et al. | |
| 2014/0349750 A1 * | 11/2014 | Thompson | A63F 13/12 463/31 |
| 2015/0007030 A1 | 1/2015 | Noy | |
| 2015/0020106 A1 * | 1/2015 | Belyaev | H04N 21/4622 725/45 |
| 2015/0046812 A1 | 2/2015 | Darby et al. | |
| 2015/0153906 A1 * | 6/2015 | Liao | G06F 3/0481 715/709 |
| 2015/0365725 A1 * | 12/2015 | Belyaev | H04N 21/458 725/46 |
| 2015/0379407 A1 * | 12/2015 | Woon | A63F 13/35 463/42 |

OTHER PUBLICATIONS

Notice of Allowance and Fees Due for U.S. Appl. No. 14/706,933 mailed Jan. 4, 2016.

* cited by examiner

| | User ID | Campaign ID | Approval | Warning | Ranking |
|---|---|---|---|---|---|
| Response Video 1 | 1234 | ABCD | Approved | | 1 |
| Response Video 2 | 5678 | ABCD | Approved | | 2 |
| Response Video 4 | 2468 | ABCD | Pending | | |
| Response Video 5 | 3579 | ABCD | Disapproved | Y | |

FIG. 6C

MEDIA CONTENT CREATION APPLICATION

CROSS-REFERENCE TO RELATED APPLICATIONS

This application is related to non-provisional application No. 14/706,933, entitled "Single Media Player Simultaneously Incorporating Multiple Different Streams for Linked Content" filed on even date herewith, which is incorporated herein by reference in its entirety.

BACKGROUND

Some embodiments described herein relate generally to the methods and apparatus for a media content creation application.

Traditional news/entertainment programs provide multimedia presentations of curated content from professional content providers and presented by paid professional presenters/anchors. Said another way, current news programs produce content in-house, or select third party content to present on a television or online program. Current news programs do not, however, currently produce programs that consist predominantly of curated professional quality amateur submissions that were submitted in response to a request.

Current media content creation applications offer a platform for users to produce media for public viewing. Currently, a user can record audio and/or video, import that recorded audio and/or video into an editing portion of the content creation application, or a separate editing application. A user can then edit the media and then upload and/or otherwise share their edited content for public or limited sharing.

Such media content creation applications are not, however, integrated with a media player or dynamically integrated with topic requests associated with a media player such that video produced by users are automatically formatted according to the request and linked to the topic request via the media player.

Accordingly, a need exists for media content creation application that can link responses to topic requests.

SUMMARY

In some embodiments an apparatus includes a processor included within a compute device, operatively coupled to a memory, and is configured to execute an application module and a recording module. The application module is configured to receive, at a compute device, an indication of a user selection of a video request from a list of video requests. The video request is associated with a list of characteristics and is associated with a video request identifier. The application module is configured to, based on the video request identifier, define a video recording environment in accordance with the list of characteristics. The recording module is configured to record, during a time and using a camera integrated with the compute device, a video such in accordance with the list of characteristics. The application module is configured to associate the video with a relationship indicator indicative of the relationship between the video and the video request. The application module is configured to send, to a server device from the compute device, a copy of the video including the relationship indicator such that the server (1) stores a copy of the video and (2) associates, based on the relationship indicator, the video with other videos that each have a relationship with the video request.

BRIEF DESCRIPTION OF THE DRAWINGS

FIGS. 6A-6C depict examples of tables included in a database coupled to a media content creation application according to an embodiment.

DETAILED DESCRIPTION

Figure 1:
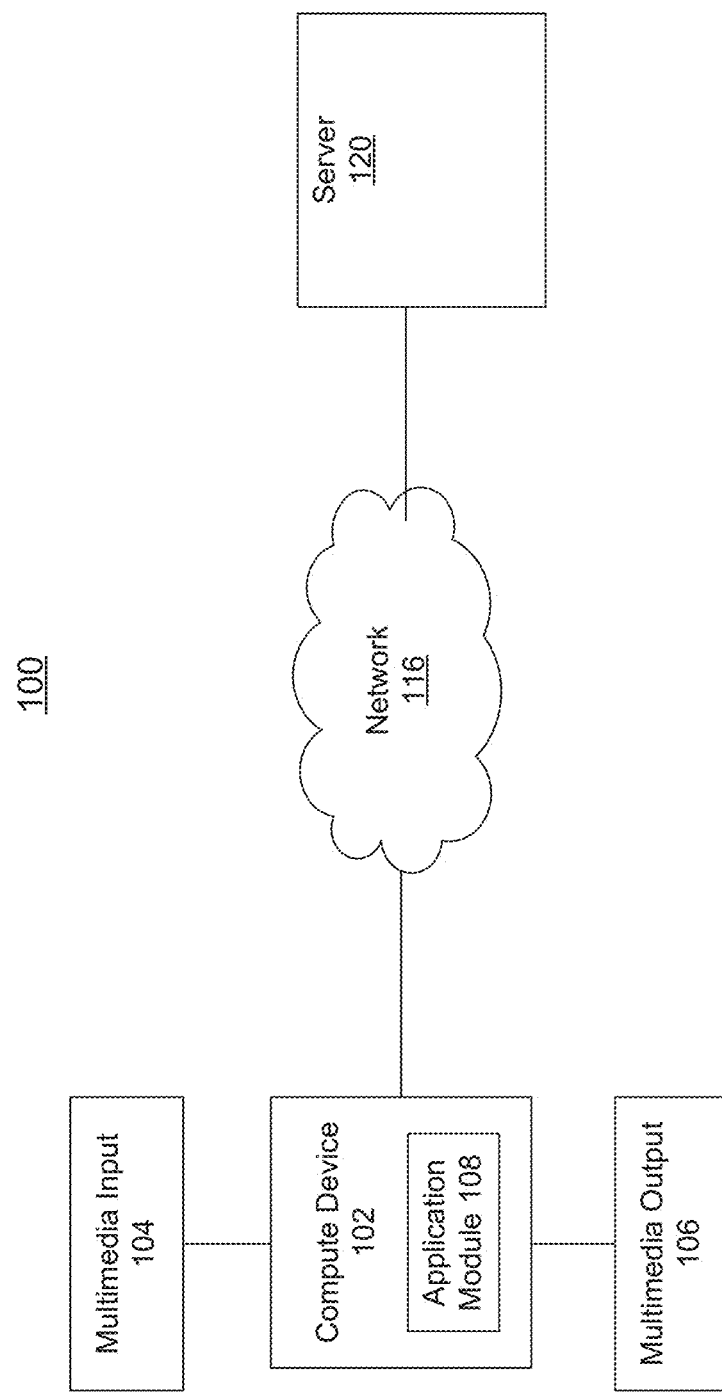
FIG. 1 is a block diagram showing a multimedia presentation system, according to an embodiment.

In some embodiments an apparatus includes a processor included within a compute device, operatively coupled to a memory, and configured to execute an application module and a recording module. The application module is configured to receive, at a compute device, an indication of a user selection of a video request from a list of video requests. The video request is associated with a list of characteristics and is associated with a video request identifier. The application module is configured to, based on the video request identifier, define a video recording environment in accordance with the list of characteristics. The recording module is configured to record, during a time and using a camera integrated with the compute device, a video such in accordance with the list of characteristics. The application module is configured to associate the video with a relationship indicator indicative of the relationship between the video and the video request. The application module is configured to send, to a server device from the compute device, a copy of the video including the relationship indicator such that the server (1) stores a copy of the video and (2) associates, based on the relationship indicator, the video with other videos that each have a relationship with the video request.

In some embodiments a method includes receiving, at a mobile device, an indication of a user selection of a video request from a list of video requests. The video request is associated with a list of characteristics including a first characteristic, a second characteristic and a third characteristic. The method includes receiving, at the mobile device and from a compute device, (1) an indication of the first characteristic, (2) a list of multimedia elements associated with the second characteristic, and (3) an overlay associated with the third characteristic. The method includes receiving, at the mobile device, an indication of a user selection of a multimedia element from the list of multimedia elements. The method includes recording, during a time and using a camera integrated with the mobile device, a video such that a first characteristic of the video corresponds to the first characteristic from the list of characteristics. The method includes sending a signal to cause the mobile device to present (1) during at least a first portion of the time and using a multimedia output integrated with the mobile device, the overlay, and (2) during at least a second portion of the time and using the display, the multimedia element. The method includes sending, to the compute device from the mobile device, a copy of the video.

In some embodiments a method includes receiving, at a compute device from a first mobile device, (1) a first video recorded at the first mobile device in response to a video request, (2) an indication of a selection of a first multimedia element, and (3) an overlay associated with the video request. The first video includes a relationship indicator indicative of a relationship between the first video and the video request. The method includes receiving, at the compute device from a second mobile device, (1) a second video recorded at the second mobile device in response to the video request, (2) an indication of a selection of a second multimedia element, and (3) the overlay associated with the video request. The second video includes the relationship indicator indicative of a relationship between the second video and the video request. The method includes defining, at the compute device, a list to include the first video and the second video based on the both the first video and the second video including the relationship indicator. The method includes sending, from the compute device, an indication of a ranking of the first video relative to the second video.

As used in this specification, a module can be, for example, any assembly and/or set of operatively-coupled electrical components associated with performing a specific function(s), and can include, for example, a memory, a processor, electrical traces, optical connectors, software (that is stored in memory and/or executing in hardware) and/or the like.

As used in this specification, the singular forms "a," "an" and "the" include plural referents unless the context clearly dictates otherwise. Thus, for example, the term "a compute device" is intended to mean a single compute device or a combination of compute devices.

As described herein, by way of example, a media content creation application (1) can be linked to a media player, (2) can receive parameters associated with a topic request, and (3) can package user generated content in accordance with the received parameters for export and viewing to the media player and/or other video sharing applications.

The media content creation application can be linked to a media player. In this manner, if a user is viewing a topic request in the media player and desires to make a video in response to the topic request, clicking on the appropriate embedded link in the media player will open the media content creation application, and the media content creation application, if opened in response to a topic request, will open preloaded with that topic request's parameters.

The media content creation application can receive parameters associated with a topic request. The parameters can be pushed to or pulled from the media player and/or other storage location (e.g., a database) in response to the user accepting a request to respond to a topic request. The parameters can be, for example, length of video, formatting of video (filters, etc.), formatting of the intro page and trailer, additional media (video, still pictures, audio, music, etc.) approved for use in the response, for example, as a cut-in.

The media content creation application can package, i.e. assemble, the final user video based on, among other things, the received parameters. By way of example, the media content creation application can restrict the maximum length of the video; automatically insert the selected cut-in(s), overlays, music, etc. to fit the parameters. Furthermore, the media content creation application can optionally submit the user's content for curation/selection and inclusion in a produced "show" including commentary and selected responses related to the topic.

FIG. 1 is block diagram showing a multimedia presentation system ("system") 100 according to an embodiment. As shown in FIG. 1, the system 100 includes a compute device 102 and a server device 120 that are coupled via a network 116. Compute device 102 includes an application module 108 and is operatively coupled to a multimedia input 104 and a multimedia output 106.

The compute device 102 (e.g., a mobile compute device) and the server device 120 are in communication via the network 116. The network 116 can be any suitable network or combination of networks. For example, in some embodiments, the network 116 can be a local area network (LAN), a wide area network (WAN), a metropolitan area network (MAN), a worldwide interoperability for microwave access network (WiMAX), an intranet, the Internet, an optical fiber (or fiber optic)-based network, a virtual network, and/or any combination thereof. Moreover, at least a portion of the network 116 can be implemented as a wireless network. For example, in some embodiments, the compute device 102 can be in communication with the network 116 via a wireless access point or the like (not shown in FIG. 1) that is operably coupled to the network 116. The server device 120 can similarly be in communication with the network 160 via a wired and/or wireless connection.

The compute device 102 can be any suitable compute device. For example, in some embodiments, the compute device 102 is a mobile compute device (smartphone, tablet, laptop, etc.) that is wirelessly in communication with the network 116 and/or the server device 120. In other embodiments, compute device 102 is a desktop computer, television, set-top box, etc. The compute device 102 includes the application module 108.

Figure 2:
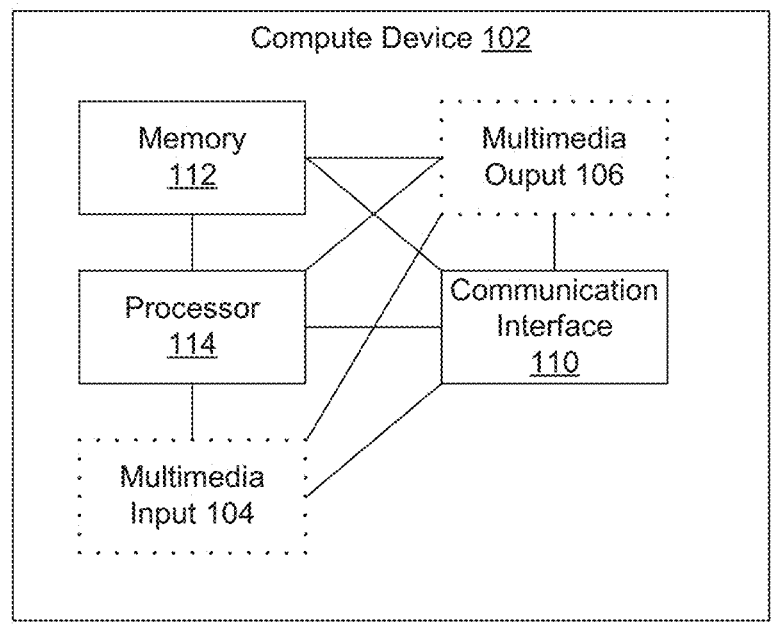
FIG. 2 is a block diagram depicting a compute device from the multimedia presentation system shown in FIG. 1.

As shown in FIG. 2, the compute device 102 includes a memory 112, a processor 114, and a communication interface 110. In some embodiments, such as, for example, as shown in FIG. 2, multimedia input 104 and multimedia output 106 can be integral with the compute device 102 (shown as dashed lines in FIG. 2, by way of example, a smartphone or tablet). In other embodiments, multimedia input 104 and multimedia output 106 can be separate from the compute device 102 (by way of example, a desktop computer). The memory 112 can be, for example, a random access memory (RAM), a memory buffer, a hard drive, a read-only memory (ROM), an erasable programmable read-only memory (EPROM), and/or the like. In some embodiments, the memory 112 can store, for example, one or more software modules and/or code, for example application module 108, that can include instructions to cause the processor 114 to perform one or more processes, functions, and/or the like. For example, in some embodiments, the memory 112 can include a software module and/or code that can include instructions to cause the processor 114 to operate media player application and/or a multimedia content creation application. The memory 112 can further include instructions to cause the communication interface 110 to send and/or receive one or more signals associated with the input to or output from, respectively, the server device 120, as described in further detail herein.

The processor 114 can be any suitable processing device configured to run or execute a set of instructions or code such as, for example, a general purpose processor, a central processing unit (CPU), an accelerated processing unit (APU), an application specific integrated circuit (ASIC), a field programmable gate array (FPGA), and/or the like. As such, the memory 112 can store instructions, for example, application module 108, to cause the processor 114 to execute modules, processes, and/or functions associated with, for example, a media player application and/or a multimedia content creation application, as described in further detail herein.

The multimedia input 104 can be any suitable component, subsystem, device and/or combination of devices. For example, in some embodiments, the multimedia input device 104 can be an input port or the like that can be operably coupled to the memory 112 and the processor 114, as well as, for example, a camera, a haptic input device, an audio input device, an accelerometer, and/or the like (not shown in FIGS. 1 and 2). The multimedia input 104 can be configured to receive a signal (e.g., from a camera) associated with a media player application and/or a multimedia content creation application, can forward the signal and/or otherwise send another signal representing that signal to the processor 114 for any suitable processing and/or analyzing process, as described in further detail herein. In some embodiments, the multimedia input 104 can be an integrated camera, for example, a camera that shares a housing with compute device 102 (e.g. a smartphone, tablet, laptop, etc.) In other embodiments, the multimedia input 104 can be a peripheral camera, for example, a camera having a housing distinct from compute device 102, but that is coupled to and co-located with compute device 102 (e.g. an add-on webcam, a digital camera or camcorder, etc.) In some embodiments, the multimedia input 104 can be a combination of elements, for example, a camera coupled to a microphone and/or an accelerometer.

The multimedia output 106 of the compute device 102 can be any suitable component, subsystem, device and/or combination of devices. For example, in some embodiments, the multimedia output 106 that can provide an audio-visual user interface, haptic output, etc. for the compute device 102. In some embodiments, the multimedia output 106 can be at least one display. For example, the multimedia output 106 can be a cathode ray tube (CRT) display, a liquid crystal display (LCD) display, a light emitting diode (LED) display, and/or the like. In some embodiments, the multimedia output device 106 can be a speaker that can receive a signal to cause the speaker to output audible sounds such as, for example, instructions, verification questions, confirmations, etc. In other embodiments, the multimedia output device 106 can be a haptic device that can receive a signal to cause the haptic output device to vibrate at any number of different frequencies. As described in further detail herein, the multimedia output 106 can provide the user interface for a software application (e.g., mobile application, internet web browser, and/or the like). In some embodiments, the multimedia output 106 can be a combination of elements, for example, a display coupled to a speaker and/or a haptic output device.

The communication interface 110 of the compute device 102 can be any suitable component, subsystem, device that can communicate with the network 116. More specifically, the communication interface 110 can include one or more wireless interfaces, such as, for example, Ethernet interfaces, optical carrier (OC) interfaces, and/or asynchronous transfer mode (ATM) interfaces. In some embodiments, the communication interface 110 can be, for example, a network interface card and/or the like that can include at least a wireless radio (e.g., a WiFi 0 radio, a Bluetooth® radio, etc.). As such, the communication interface 110 can send signals to and/or receive signals from the server device 120.

Referring back to FIG. 1, the server device 120 can include and/or can otherwise be operably coupled to a database 126. The database 126 can be, for example, a table, a repository, a relational database, an object-oriented database, an object-relational database, a SQL database, and XML database, and/or the like. In some embodiments, the database 126 can be stored in a memory of the server device 120 and/or the like. In other embodiments, the database 126 can be stored in, for example, a network access storage device (NAS) and/or the like that is operably coupled to the server device 120. In some embodiments, the database 126 can be in communication with the server device 120 via the network 116. In such embodiments, the database 126 can communicate with the network 116 via a wired or a wireless connection. The database 126 can be configured to at least temporarily store data such as, for example, data associated with multimedia presentations. In some embodiments, at least a portion of the database 126 can be stored in, for example, the memory 112 of the compute device 102.

The server device 120 can be any type of device that can send data to and/or to receive data from one or more compute devices (e.g., the compute device 102) and/or databases (e.g., the database 126) via the network 16. In some embodiments, the server device 120 can function as, for example, a server device (e.g., a web server device), a network management device, an administrator device, and/or so forth. The server device 120 can be located within a central location, distributed in multiple locations, and/or a combination thereof. Moreover, some or all of a set of components of the server device 120 can be located within a user device (e.g., the compute device 102) and/or any other device or server in communication with the network 116.

Figure 3:
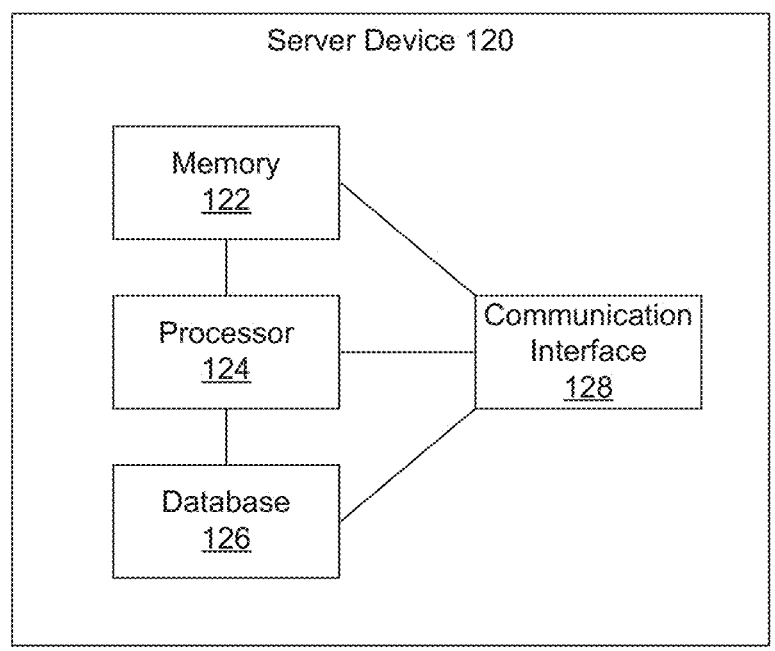
FIG. 3 is a block diagram depicting a server device from the multimedia presentation system shown in FIG. 1.

As shown in FIG. 3, the server device 120 includes a communication interface 128, a memory 122, a processor 124, and the database 126. The communication interface 178 of the server device 120 can be any suitable device that can communicate with the network 160 via a wired or wireless communication. More specifically, the communication interface 128 can include one or more wired or wireless interfaces, such as, for example, Ethernet interfaces, optical carrier (OC) interfaces, and/or asynchronous transfer mode (ATM) interfaces. In some embodiments, the communication interface 128 can be, for example, an Ethernet port, a network interface card, and/or the like. In some embodiments, the communication module 128 can include a wireless radio (e.g., a WiFi® radio, a Bluetooth® radio, etc.) that can communicate with the network 116.

The memory 122 can be, for example, a random access memory (RAM), a memory buffer, a hard drive, a read-only memory (ROM), an erasable programmable read-only memory (EPROM), and/or the like. In some embodiments, the memory 122 can be configured to store, for example, one or more software modules and/or code that can include instructions to cause the processor 122 to perform one or more processes, functions, and/or the like. For example, in some embodiments, the memory 122 can include a software module and/or code that can include instructions to cause the communication interface 128 to receive and/or send one or more signals from or to, respectively, the compute device 102 (via the network 116). In some instances, the one or more signals can be associated with media player applications and/or a multimedia content creation applications, and/or the like. The memory 122 can further include instructions to cause the processor 124 to analyze, classify, compare, verify, and/or otherwise process data received from the compute device 102. In addition, the memory 122 can include instructions to cause the processor 124 to query, update, and/or access data stored in the database 126, as described in further detail herein.

The processor 124 of the server device 120 can be any suitable processing device configured to run or execute a set of instructions or code such as, for example, a general purpose processor, a central processing unit (CPU), an accelerated processing unit (APU), an application specific integrated circuit (ASIC), a field programmable gate array (FPGA), a front end processor, a network processor, and/or the like. As such, the memory 122 can store instructions to cause the processor 124 to execute modules, processes, and/or functions associated with, for example, sending and/or receiving signals via the network 120, analyzing; classifying, comparing, verifying, and/or processing data; and/or querying, updating, and/or otherwise accessing data stored in the database 126, and/or the like.

Figure 4:
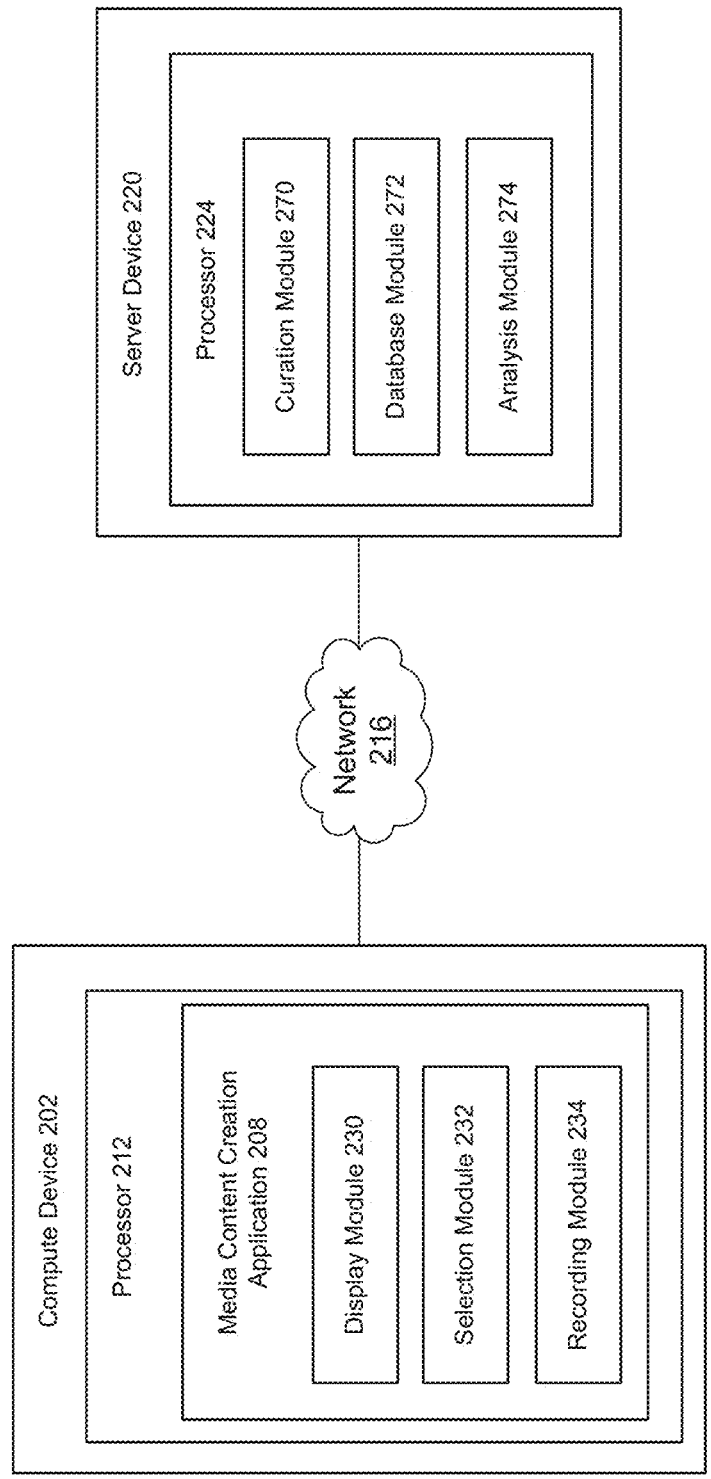
FIG. 4 is a block diagram depicting a compute device configured to execute a media content creation application and that is operatively coupled to a server device according to an embodiment.
Figure 5B:
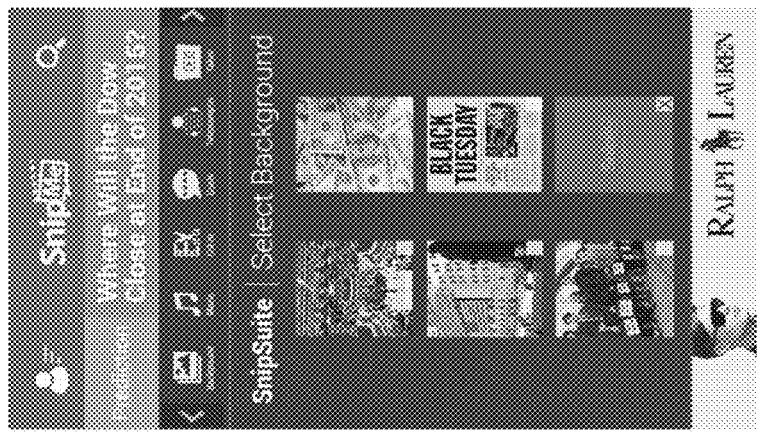
FIGS. 5A-5N are graphical representations of a content creation environment defined by the media content creation application shown in FIG. 4.
Figure 5A:
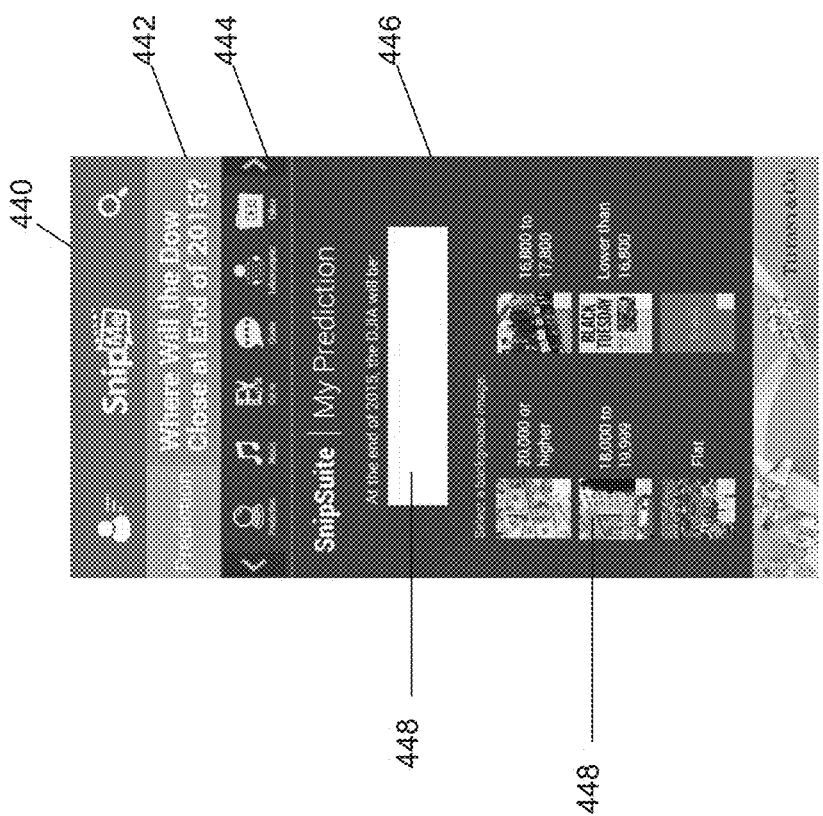
Figure 5E:
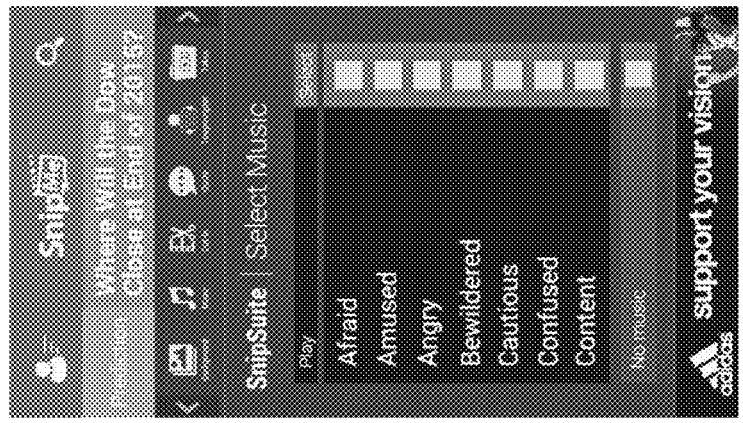
Figure 5D:
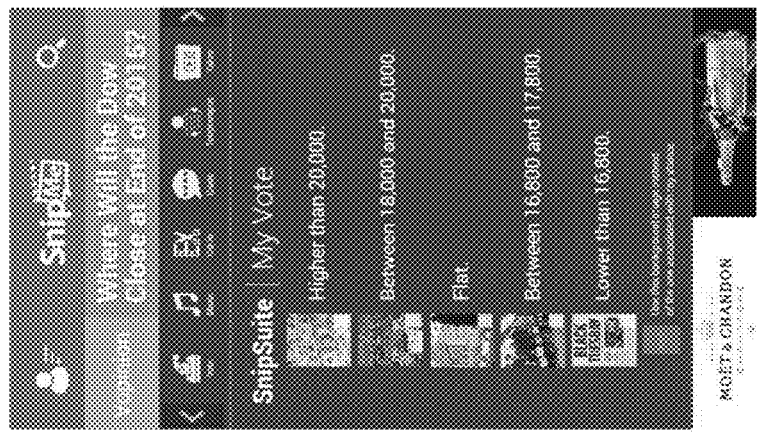
Figure 5C:
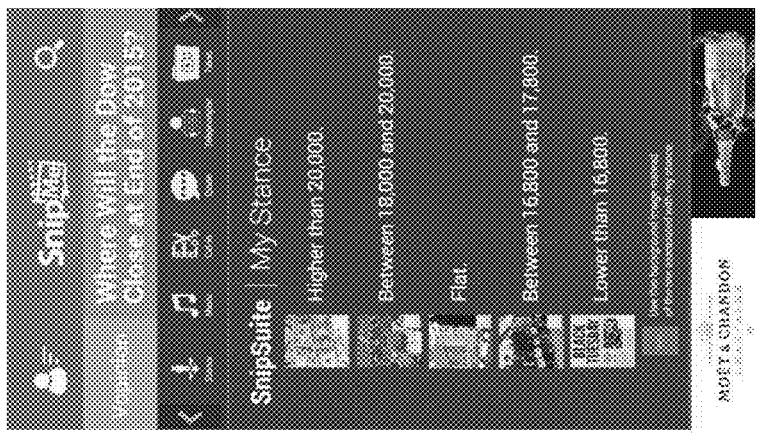
Figure 5H:
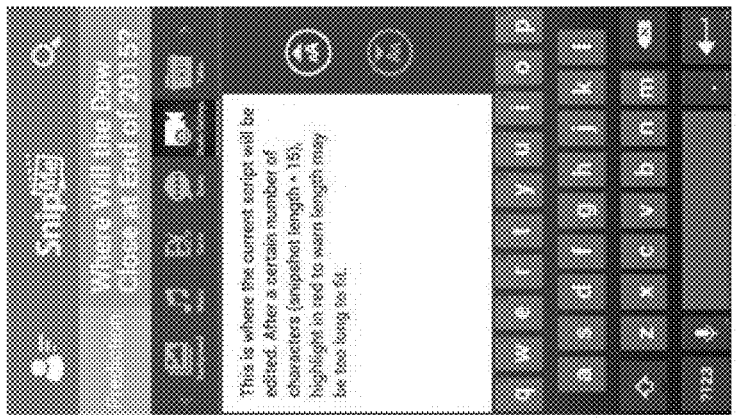
Figure 5G:
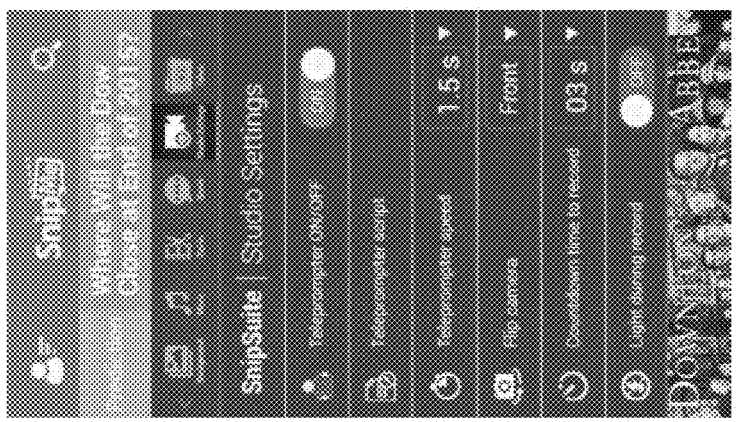
Figure 5F:
Figure 5K:
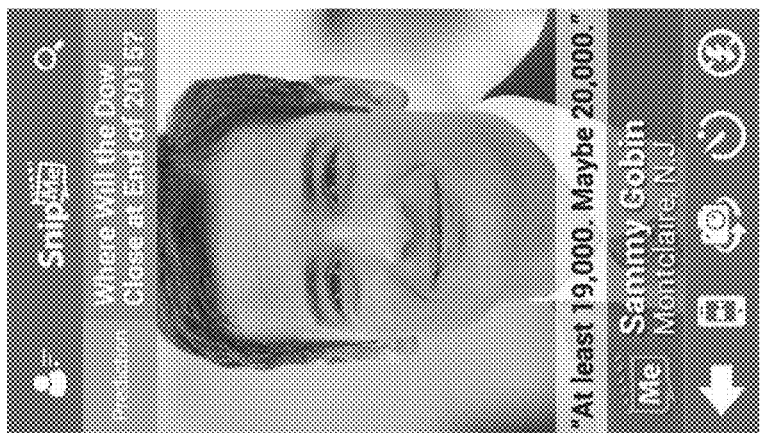
Figure 5J:
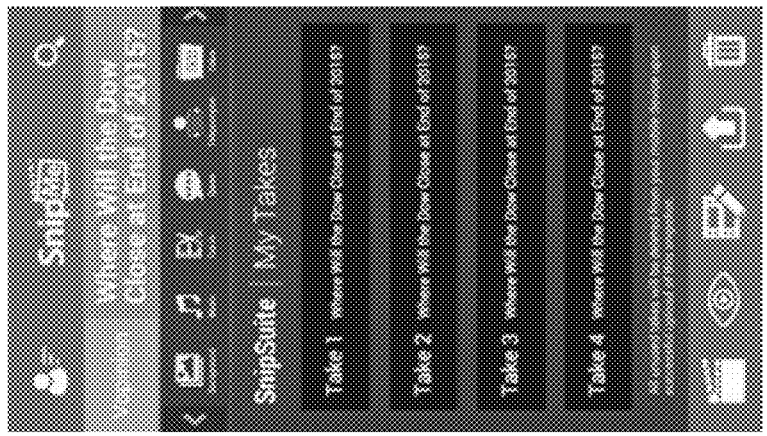
Figure 5I:
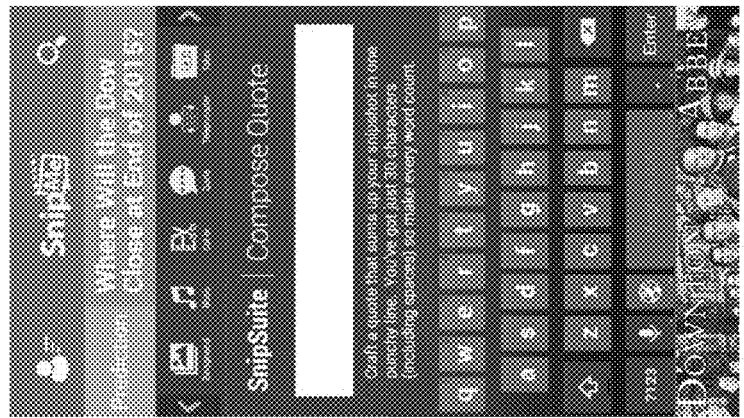
Figure 5L:
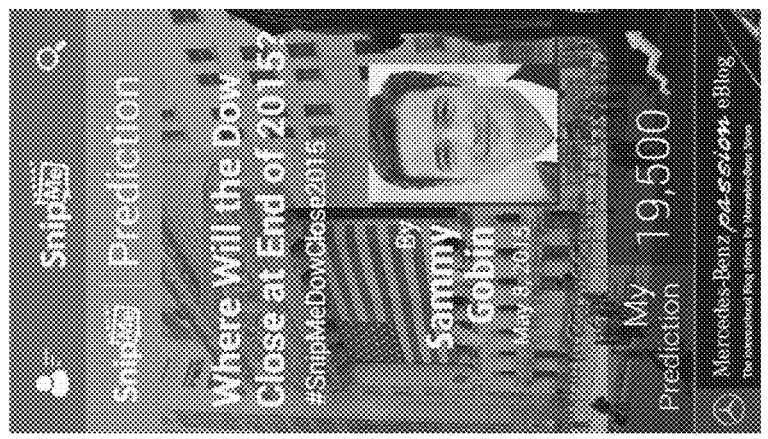
Figure 5M:
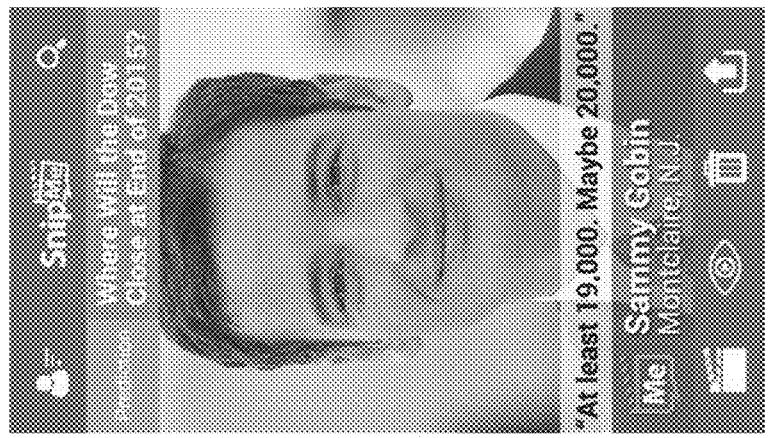
Figure 5N:
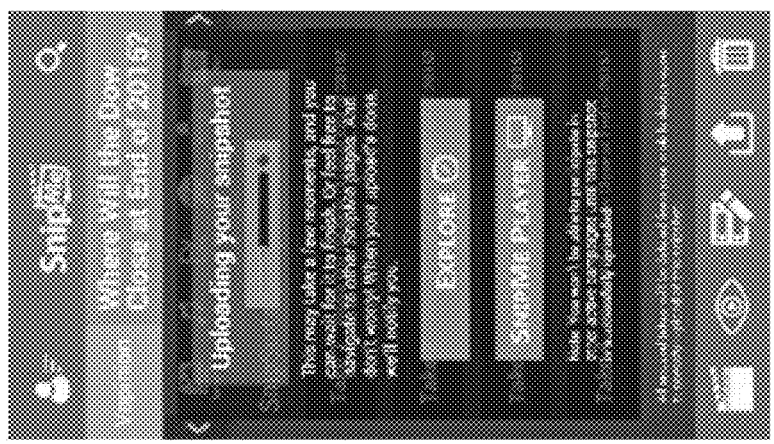

FIG. 4 is a block diagram depicting a compute device 202 operatively coupled to a server device 220 via a network 216. Compute device 202, network 216 and server device 220 can be similar to and include similar elements as compute device 102, network 116 and server 120, respectively. As shown in FIG. 4, compute device 202 includes a processor 212 configured to execute a media content creation application 208. FIGS. 5A-5N are graphical representations of a user interface for, and an output of, a content creation environment ("content creation environment") 440 defined by the media content creation application 208. The media content creation application 208 can include software modules and/or code (stored in memory or implemented in hardware such as processor 212) that can include instructions to cause processor 212 to define the content creation environment 440. In some embodiments, the media content creation application can be a native application on a desktop and/or mobile computing device. In some embodiments, the media content creation application can be a web (browser) based application. As shown in FIG. 4, the media content creation application 208 includes a display module 230, a selection module 232, and a recording module 234.

The display module 230 can be configured to send signals to cause a display (not shown) of compute device 202 to render a graphical representation of the content creation environment 440. The selection module 232 can to receive signals indicative of a selection by a user of a compute device 202. In some embodiments, the selection can be any number of inputs, backgrounds, music, cut-ins, teleprompter configurations, recording, previewing, editing, uploading, etc. The selection module 232 can communicate with the display module 230 to cause the compute device 202 to display the content creation environment 440. The recording module 234 can receive signals from a multimedia input (not shown) of compute device 202 to capture audio, video and/or other inputs from the user of compute device 202.

As shown in FIG. 5A, content creation environment 440 includes a graphical representation of a campaign request 442, a toolbar 444, and a user interaction portion 446. The user interaction portion can include one or more fields and/or selections 448. Content creation environment 440 defined by media content creation application 208 can be configured to allow a user of compute device to produce multimedia content, for example, in response to a campaign/topic request, in response to a response to the campaign request (and responses to responses), etc. Content creation environment 440 can allow a user or administrator to define the campaign request itself, and define the characteristics of the responses, and response to responses. Content creation environment 440 can allow a user define a user account for use with media content creation application 208 and associated media players, websites, etc. In this manner, a user can enter user information (name, physical location, place of birth, nationality, race, gender, age, sexual orientation, education level, area of career, hobby expertise, income level, political affiliation, religious affiliation, social influence level, a graphical representation of the user or an opinion of the user and/or etc.). The content creation environment 440 can allow the user to associate a picture with their user profile, for example, taking a photograph of the user using a multimedia input element of compute device 202 (integrated camera, webcam, etc, as described above).

Content creation environment 440 includes the graphical representation of a campaign request 442, the toolbar 444, and the user interaction portion 446. The user interaction portion 446 can include one or more fields and/or selections 448. By way of example, and with reference to FIG. 5A, the graphical representation of a campaign request 442 can display "Where will the Dow Close at the End of 2015?" The toolbar 444 can include one or more icons indicative of one or more interactive buttons configured to navigate a user through defining a video response to the campaign request, select backgrounds, vote, music, and/or etc. In this example, the tool bar includes "Background," "Music," "Cut-in," "Quote," "Teleprompter/Studio Settings," "Takes." Additional icons can be available on the toolbar by scrolling through the toolbar, and/or based on the characteristics selected by the definer of the campaign request. In this example, a background/voting page, the user interaction portion 446 includes a first field 448 that prompts a user to manually enter their prediction, and a second field 448 prompts the user to select a background picture based on their prediction. While FIGS. 5B-5N omit references numbers for clarity, the content creation environments depicted in FIGS. 5B-5N include similar features and similar reference numbers are applicable throughout. FIGS. 5B-5D depict alternative background voting pages, for example, select a background only (FIG. 5B), select a stance including a preselected background based on the selected stance (FIG. 5C), select a vote including a preselected background based on the selected vote (FIG. 5D). As shown in each of FIGS. 5A-5D, a user can also select a background that is not shown, for example, from the user's photo library.

In this example, a user can select the "Music" icon on toolbar 444. In response, multimedia content creation application 208 can cause content creation environment 440 to change such that the user interaction portion displayed can change to allow the user to select music for the video response (FIG. 5E). In this example, the user can check one of fields 448. In some embodiments, the user can listen to a preview of the music prior, during, or after the selection. Multimedia content creation application 208 can similarly cause content creation environment 440 to change to display different user interaction portions 446 depending on, among other things, what icon from toolbar 444 is selected. For example, a user can select a cut-in (FIG. 5F), configure a various studio settings (teleprompter, camera, countdowns, lighting, etc.) (FIGS. 5G and 5H), compose a quote/title to describe their video response (FIG. 5I), manage recorded takes (FIG. 5J), record the video response (FIG. 5K), preview the video response, i.e., including selected background, music, cut-ins, etc. (FIG. 5L), edit the video response, i.e., cut out portions, set beginning and end, zoom, etc. (FIG. 5M), and/or upload the video response (FIG. 5N).

As shown in FIGS. 5A-5N, and in addition to what is shown in FIGS. 5A-5N, multimedia content creation application 208 includes features to improve the quality of the user video, for example, an ability to load a teleprompter script to be displayed from the recording device as the user is recording the video, delay countdown timer to allow the user to properly setup prior to record beginning, recording time countdown to end of the specified recording length, overlays, and green screen instructions and implementation to make the user appear to be in a specific environment commensurate with the video topic. In some embodiments, an overlay can be tools for assisting a user in creating content, for example, an indication where the user's face should be located on the screen, teleprompter text, etc. In some embodiments, an overlay can include information about the user (name, location, etc.) and/or about the campaign request (title, etc). In this manner, overlays can include multimedia elements that are added to a video response and representative of, for example, a user's name and/or location (hometown and/or current), a users prediction and/or other quote, additional text, audio, pictures and/or video selected by the generator of the campaign request.

In additional to any multimedia elements associated with an overlay, the various campaign request and response video characteristics described herein can include multimedia elements, for example, images, videos, sounds, text, and combinations of elements. Such multimedia elements can be associated with the various aspects of the content creation environment 440, for example, those features described herein with respect to FIGS. 5A-5N (backgrounds, cut-ins, music, etc.). The multimedia elements can be stored in a database (not shown in FIGS. 5A-5N) accessible by both a user compute device (not shown in FIGS. 5A-5N) and a server device (not shown in FIGS. 5A-5N). In some embodiments, when a user of a compute device selects a campaign request to which to respond, the compute device can retrieve the multimedia elements or representation and/or identifications of the multimedia elements. In this manner, the compute device can define both a raw and/or transcoded/encoded response video. In some embodiments, when a server device receives a raw response video, the server device can retrieve the multimedia elements from the database and can transcode/encode the raw response video to define a final response video. In this manner, the compute device and the server device may not need to transmit the multimedia elements between each other, which can reduce the size of transmissions between the compute device and the server device.

In some embodiments, a user of a compute device can launch, i.e., open, start, etc., a media content creation application by, for example, clicking on an icon representative of the media content creation application on a display associated with the compute device. In some embodiments, the user of the compute device can launch the media content creation application by, for example, clicking a link in an associated application, for example, a media player application. In such an embodiment, a user can be operating the media player application, for example a media player application as described in non-provisional application No. 14/706,933, entitled "Single Media Player Simultaneously Incorporating Multiple Different Streams for Linked Content." Specifically the user can be viewing a campaign request video, and can click a link that is configured to provide an indication to define a video response to the campaign request video. Clicking on such a link can automatically (i.e., without specific addition input from the use) launch the media content creation application. In such an example, the media content creation application can be provided with a campaign request identifier associated with the campaign request video and can request and/or otherwise retrieve characteristics that are to be associated with the campaign request video associated with the campaign request. Furthermore, when the user uploads a finished video response, the content creation application can associate the campaign request identifier with the finished video response such that the finished video response can have a linked relationship with the campaign request, as described herein.

As shown in FIG. 4, server device 220 includes a processor configured to execute a database module 272, an analysis module 274, and a curation module 270. Processor 224 can be configured to execute database module 272 to store, organize retrieve user information, campaign characteristics, campaign request videos, response videos, and/or responses to responses. In this manner, when a user selects a particular campaign request video (or video response) to which to record a response to, database module 272 can retrieve user information and/or campaign information from a database (not shown), and can provide retrieved information to the multimedia content creation application 208 on compute device 202. Similarly, when a user uploads a video, database module 272 can cause the uploaded video to be stored in a database (not shown), along with appropriate identifiers.

Processor 224 can be configured to execute analysis module 274 and curation module 270 to analyze campaign request videos, response videos, and responses to responses, in view of, among other things, users associated with those videos and responses and identifiers associated with those videos and responses. In this manner, server device 220 can (a) approve or deny videos and responses, (b) store videos and responses, (c) encode and/or transcode videos and responses, (d) present the videos and responses, and user information, for curation. Accordingly, when a user selects content to respond to (campaign request, video response, response to response, etc.), analysis module 274 can analyze the selected content, specifically analyze any identifiers associated with the selected content, and interface with a database, via, for example, database module 272 to retrieve identification of predefined characteristics associated with a response and send those identifications of predefined characteristics to the media content creation application 208. Similarly, when server 220 receives a response video from compute device 202, analysis module 274 can analyze any identifier associated with the response video as well as, for example, the users response to an opinion/vote/stance, any selected background, music, cut-in, etc., and can cause server 220 to encode and/or transcode the response video in accordance with those selections. As described above, databased module 272 can then cause the video (raw and/or encoded/transcoded) to be stored.

When a campaign request is published, as described herein, users can submit related content, specifically responses to the campaign request, and responses to responses to the campaign requests. Processor 224 can execute curation module 270 to manage the curations, approval and/or ranking of this content based on, among other things, the user who produced a particular piece of content. By way of example, curation module 270 can use a name, physical location, place of birth, nationality, race, gender, age, sexual orientation, education level, area of career, hobby expertise, income level, political affiliation, religious affiliation, graphical, social influence level, a graphical representation of the user and/or an opinion of the user to approve, disapprove, score, and/or otherwise rank the submitted content. In such an example, when a user has a number of previously approved responses, curation module 270 can automatically approve future responses until such as a time as the user is flagged, for example, for inappropriate content. Conversely, if a user submits a number of disapproved content, that user can be banned from further submission. All approved content can be made available to, for example, a media player substantially immediately upon approval. Curation module 270 can further present all approved content, ranked and/or otherwise organized (for example, by gender, political orientation, age, etc. of the user), to a curator or other user for inclusion in a multimedia presentation.

Figure 6A:
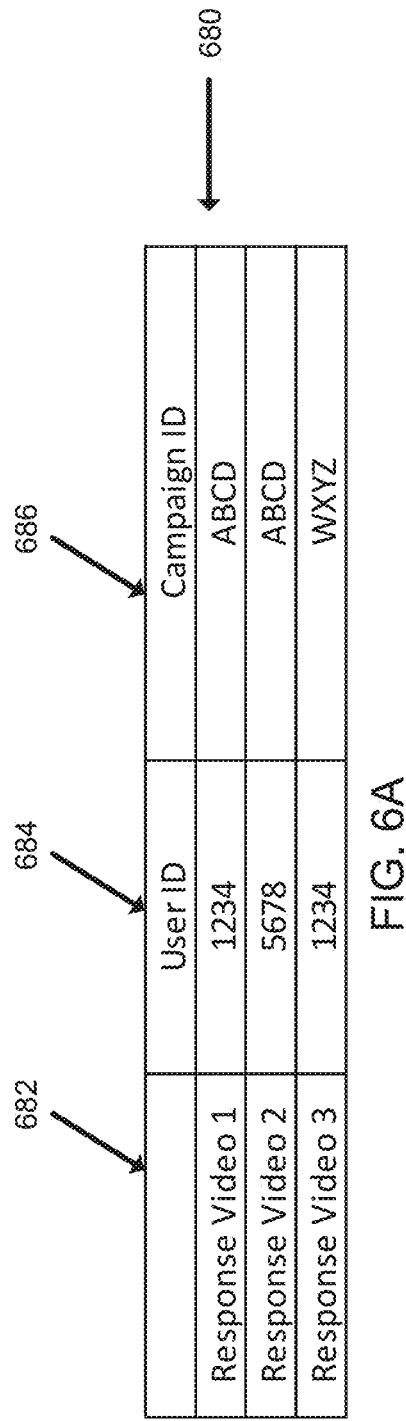
Figure 6B:
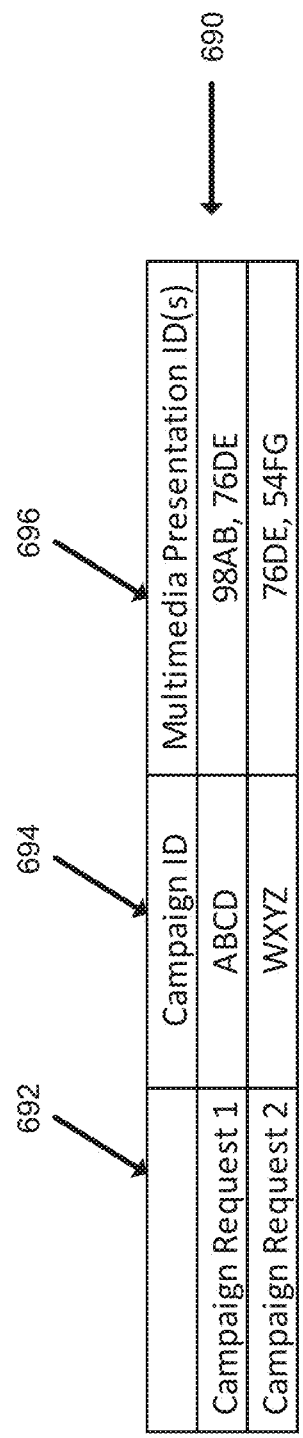

FIGS. 6A-6C depict example of tables that can be included in a database operatively coupled to a media content creation application. As shown in FIG. 6A, a table 680 includes a title column 682, a user ID column 684 and a campaign ID column 686; as shown in FIG. 6B a table 690 includes a title column 692, a campaign ID column 694 and a multimedia presentation ID column 696; as shown in FIG. 6C, a table 680' can be similar to table 680, and can include a title column 682', a user ID column 684' and a campaign ID column 686', and can additionally included an approval column 687', a warning column 688' and a ranking column 689'. While shown and described as having a particular number and type of columns, on other embodiments, either of table 680, table 690 and/or table 680' can include more, fewer and/or different combinations of column including different relationship identifiers.

In one example with reference to FIGS. 6A-6C, four users (1234, 5678, 2468, and 3579) can select to view Campaign Request 1 (ABCD), for example, by pushing an interactive button in a social media and/or media player application. In such an example, each users content creation application can identify the Campaign ID of Campaign Request 1 as "ABCD," and can cause a processor to display a user interface and a content creation environment ("content creation environment") and to retrieve any characteristics associated with Campaign Request 1. After completion of a video response, a user's respective content creation application can transmit the video response and can append Campaign ID "ABCD" as well as a respective User ID to the video response such that a server device can organize, approve and/or rank the video responses as they are received. In this example, User 1234 may be "pre-approved," such that when Response Video 1 is received, Response Video 1 is automatically approved. In such an example, Response Video 2, Response Video 4, and Response Video 5 may be approved or disapproved automatically or manually depending on a status of the respective user. A video response can be "Pending" until that video response is approved or disapproved. In some embodiments, a video response can be disapproved after being pending or approved, for example, after receiving a warning. In this example, a viewer of Response Video 4 may determine that Response Video 4 is offensive and push an interactive button of a media player indicative of a warning. In response, server device can change the status of Response Video 5 from approved (not shown) to disapproved as shown in FIG. 6C. The server device may additional flag Response Video 5 as having a warning in column 688'. Finally, the server device can rank the response video as described herein, and can indicate that ranking in the ranking column 689'. As shown in FIG. 6C, only approved response videos are ranked. In some alternative embodiments, pending and/or disapproved videos can be ranked.

While generally described with respect to news programs (politics, entertainment, etc.), the media player can also be used as a self-service platform. For example, the media player can be used to show videos associated with a wedding, other party or celebration, internal business promotion, product testimonial, corporate survey, employment application, etc. In such an example, a user can produce a request for videos for a selected group of users. The request can be to tell a story about the bride and/or groom. All and/or approved video can be viewable via one of the multimedia streams. And finally a user, or a third party professional producer, can prepare and present the final wedding video (multimedia presentation) that includes selected videos submitted in response to the request.

While generally described herein as user defining to responses to topic requests, the application can be used to create user profile or biographical videos, videos which respond to a specific user's previous video submission (e.g. instead of responding to the overall topic itself, User A creates a response to User B's response to the topic request), as well as responses to those responses. All of these can include their own parameters.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:
1. A method, comprising:
receiving, at a compute device from a first mobile device, (1) a first video recorded at the first mobile device in response to a campaign request for videos, the campaign request for videos having an associated campaign request identifier, (2) an indication of a selection of a first multimedia element, and (3) an overlay associated with the campaign request for videos, the first video associated with the campaign request identifier such that the first video has a linked relationship with the campaign request for videos;
receiving, at the compute device from a second mobile device, (1) a second video recorded at the second mobile device in response to the campaign request for videos, (2) an indication of a selection of a second multimedia element, and (3) the overlay associated with the campaign request for videos, the second video associated with the campaign request identifier such that the second video has a linked relationship with the campaign request for videos;
defining, at the compute device, a ranked list of a plurality of videos associated with the campaign request identifier, the ranked list including a reference to the first video and a reference to the second video; and sending, from the compute device, an indication of a ranking of the first video relative to the second video for the campaign request for videos having the associated campaign request identifier.

2. The method of claim 1, further comprising encoding the first video based on the first video and including the overlay and the first multimedia element.

3. The method of claim 1, further comprising:
receiving user information associated with a user of the first mobile device; and
if the user of the first mobile device is approved, updating the ranked list to indicate a status of the first video is approved.

4. The method of claim 1, further comprising:
receiving, at the compute device from a third mobile device, a third video recorded at the third mobile device in response to the campaign request for videos;
receiving user information associated with a user of the third mobile device; and
if the user of the third mobile device is not approved, updating the ranked list to indicate a status of the third video is pending.

5. The method of claim 1, further comprising:
receiving, at the compute device from a third mobile device, a third video recorded at the third mobile device in response to the campaign request for videos;
receiving, at the compute device, an indication that the third video includes a violation;
updating the ranked list to indicate a status of the third video is disapproved; and
updating, based on the violation, user information associated with a user of the third mobile device to include a warning.

6. The method of claim 1, further comprising ranking the first video higher than the second video based on at least one of a name, physical location, place of birth, nationality, race, gender, age, sexual orientation, education level, area of career, hobby expertise, income level, political affiliation, religious affiliation, graphical, social influence level, a graphical representation of the user or an opinion of the user associated with the campaign request for videos of a user of the first mobile device relative to a user of the second mobile device.

7. The method of claim 1, further comprising:
receiving, at the compute device from a third mobile device, a response video recorded in response to the first video; and
modifying the response video to include a relationship indicator indicating a relationship between the response video and the first video.

8. The method of claim 1, further comprising:
receiving, at the compute device from a third mobile device, a third video recorded at the third mobile device in response to the campaign request for videos;
receiving user information associated with a user of the third mobile device; and
if the user of the third mobile device is not approved:
updating, at a first time, the ranked list to indicate a status of the third video is pending;
receiving, at a second time after the first time, an indication that the third video is approved; and
updating, at a third time after the second time, the ranked list to indicate a status of the third video is approved.

9. The method of claim 1, wherein the selection of the first multimedia element is based on a selection from a plurality of multimedia elements that includes the first multimedia element, the plurality of multimedia elements stored in a database in association with the campaign request for videos.

10. The method of claim 9, wherein the first multimedia element is selected from a plurality of images, a plurality of videos, a plurality of music selections, or a plurality of text captions.

11. The method of claim 1, wherein the first video is recorded at the first mobile device in response to a graphical representation of the campaign request for videos that is displayed on the first mobile device.

12. The method of claim 11, wherein the graphical representation is text based.

13. The method of claim 11, wherein the graphical representation is video based.

14. A non-transitory computer-readable medium having a collaborative content creation tool stored thereon for use on one or more server devices, the collaborative content creation tool including:
a database section that when executed, causes the collaborative content creation tool to store a first video, which is recorded at a first mobile device in response to a campaign request for videos displayed on the first mobile device, in accordance with a campaign request identifier associated with the campaign request for videos, and causes the collaborative content creation tool to store a second video, which is recorded at a second mobile device in response to the campaign request for videos displayed on the second mobile device, in accordance with the campaign request identifier associated with the campaign request for videos;
an analysis section that when executed, causes the collaborative content creation tool to encode the first video with a first multimedia element selected by a user of the first mobile device and with an overlay associated with the campaign request for videos to produce a first encoded video, and causes the collaborative content creation tool to encode the second video with a second multimedia element selected by a user of the second mobile device and with the overlay associated with the campaign request for videos to produce a second encoded video; and
a curation section that when executed, causes the collaborative content creation tool to generate a multimedia presentation based on a ranked list of a plurality of videos associated with the campaign request identifier, the ranked list including a reference to the first encoded video and the second encoded video.

15. The non-transitory computer-readable medium of claim 14, wherein the ranked list includes a status of the first encoded video as approved based on an approval of a user of the first mobile device.

16. The non-transitory computer-readable medium of claim 14, wherein the ranked list is determined at least in part based on a characteristic of a user of the first mobile device.

17. The non-transitory computer-readable medium of claim 16, wherein the ranked list is determined at least in part based on a physical location of a user of the first mobile device.

18. The non-transitory computer-readable medium of claim 14, wherein the database section retrieves a plurality of media elements, which includes the first multimedia element, from storage using the associated campaign request identifier for provision to the first mobile device.

19. The non-transitory computer-readable medium of claim 18, wherein the first multimedia element is selected from a plurality of images, a plurality of videos, a plurality of music selection, or a plurality of text captions.

20. A computer implemented method performed by a collaborative content creation tool on one or more server devices, comprising:
    causing the collaborative content creation tool to store a first video, which is recorded at a first mobile device in response to a campaign request for videos displayed on the first mobile device, in accordance with a campaign request identifier associated with the campaign request for videos;
    causing the collaborative content creation tool to encode the first video with a first multimedia element selected by a user of the first mobile device and with an overlay associated with the campaign request for videos to produce a first encoded video;
    causing the collaborative content creation tool to store a second video, which is recorded at a second mobile device in response to the campaign request for videos displayed on the second mobile device, in accordance with the campaign request identifier associated with the campaign request for videos;
    causing the collaborative content creation tool to encode the second video with a second multimedia element selected by a user of the second mobile device and with the overlay associated with the campaign request for videos to produce a second encoded video; and
    causing the collaborative content creation tool to generate a multimedia presentation based on a ranked list of a plurality of videos associated with the campaign request identifier, the ranked list including a reference to the first encoded video and the second encoded video.

21. The computer implemented method of claim 20, wherein the ranked list is determined at least in part based on a physical location of a user of the first mobile device.

* * * * *